United States Patent [19]
Braun et al.

[11] Patent Number: 5,393,266
[45] Date of Patent: * Feb. 28, 1995

[54] PULLEY WHEEL ELASTIC ASSEMBLY

[75] Inventors: Helmut Braun, Sinzheim; Dietmar Strauss, Bühl; Peter Klein, Edenkoben; Stefan Valtwies, Ottersweier, all of Germany

[73] Assignee: Luk Lamellen und Kupplungsbau GmbH, Bühl, Germany

[*] Notice: The portion of the term of this patent subsequent to Oct. 4, 2011 has been disclaimed.

[21] Appl. No.: 925,599

[22] Filed: Aug. 4, 1992

[30] Foreign Application Priority Data

Aug. 7, 1991 [DE] Germany .............................. 4126209
Nov. 28, 1991 [DE] Germany .............................. 4139168
Dec. 3, 1991 [DE] Germany .............................. 4139730

[51] Int. Cl.6 .................. F16H 55/36; F16D 3/12; B60K 25/02
[52] U.S. Cl. ........................... 464/67; 464/68; 192/70.17
[58] Field of Search ............... 192/30 V, 70.17, 106.1, 192/106.2; 74/574; 464/24, 66, 67, 68, 83; 416/60; 474/70, 162, 174, 903

[56] References Cited

U.S. PATENT DOCUMENTS

| 2,632,318 | 3/1953 | Meyer | 464/66 |
| 4,884,996 | 12/1989 | Schmitt et al. | 464/66 X |
| 4,944,712 | 7/1990 | Wörmer et al. | 74/574 X |
| 5,042,632 | 8/1991 | Jäckel | 192/30 V X |
| 5,048,658 | 9/1991 | Reik | 192/106.2 |
| 5,125,872 | 6/1992 | Reik | 464/67 |
| 5,156,249 | 10/1992 | Friedmann | 464/68 X |
| 5,160,007 | 11/1992 | Reik et al. | 192/70.17 |
| 5,180,044 | 1/1993 | Fukushima et al. | 464/66 X |

FOREIGN PATENT DOCUMENTS

| 3402001 | 5/1985 | Germany . |
| 4018596 | 12/1991 | Germany .............................. 464/83 |

Primary Examiner—John J. Calvert
Attorney, Agent, or Firm—Darby & Darby

[57] ABSTRACT

A sheave which can be used to transmit motion to belts or chains or as an inertial damper has an input element which can be driven by the output shaft of an internal combustion engine in a motor vehicle, an output element which is rotatable relative to the input element and can drive one or more belts or chains to transmit motion to one or more fans, pumps and/or other aggregates in a motor vehicle, and a damping unit which is installed between the input and output elements in an annular chamber defined by a housing which forms part of the input element and/or the output element. The damping unit employs long arcuate coil springs which alternate with the arms of a flange forming part of the input element or of the output element, and with pockets provided on the housing and forming part of the output element or of the input element. One or more antifriction bearings are installed between the input and output elements.

38 Claims, 4 Drawing Sheets

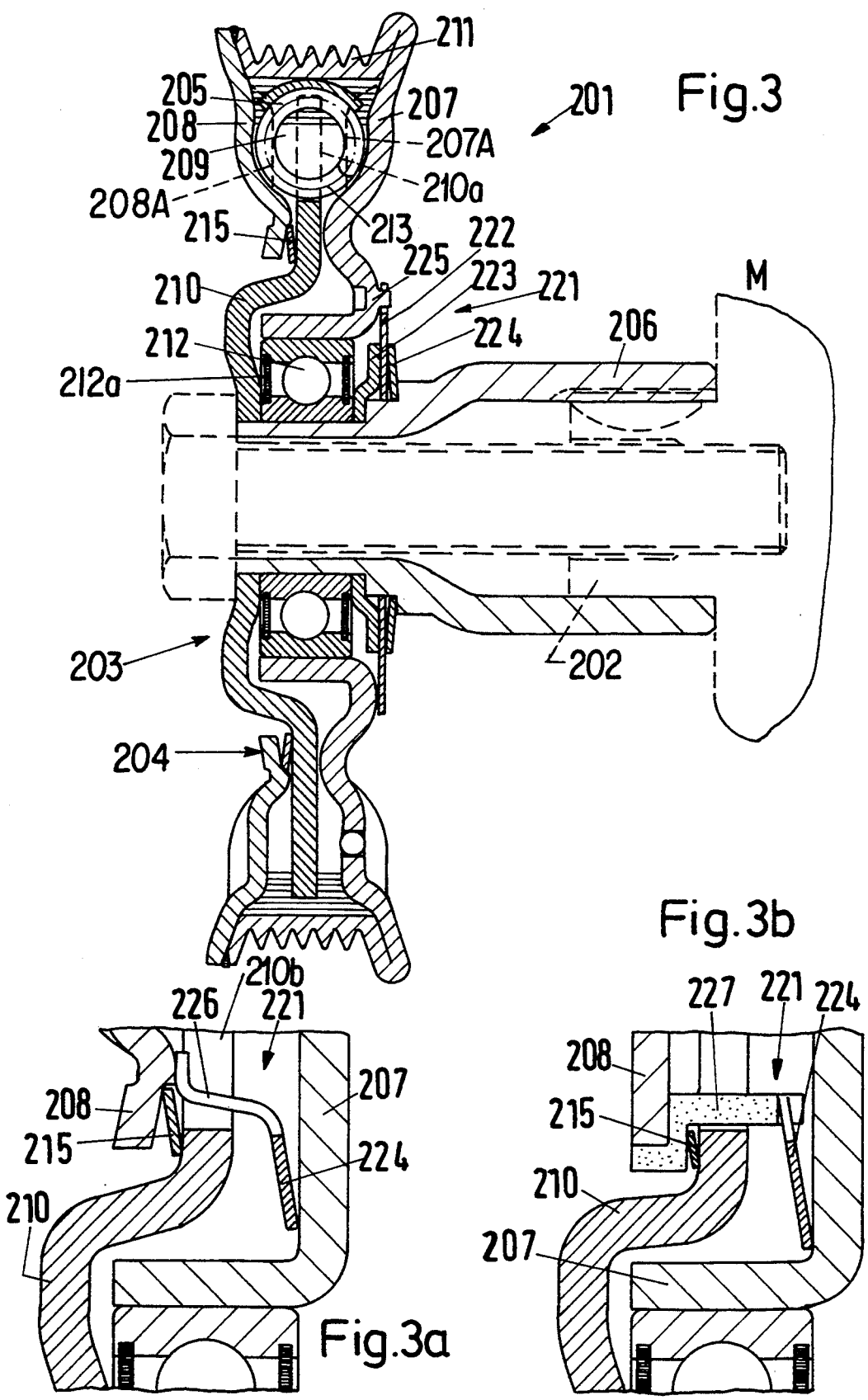

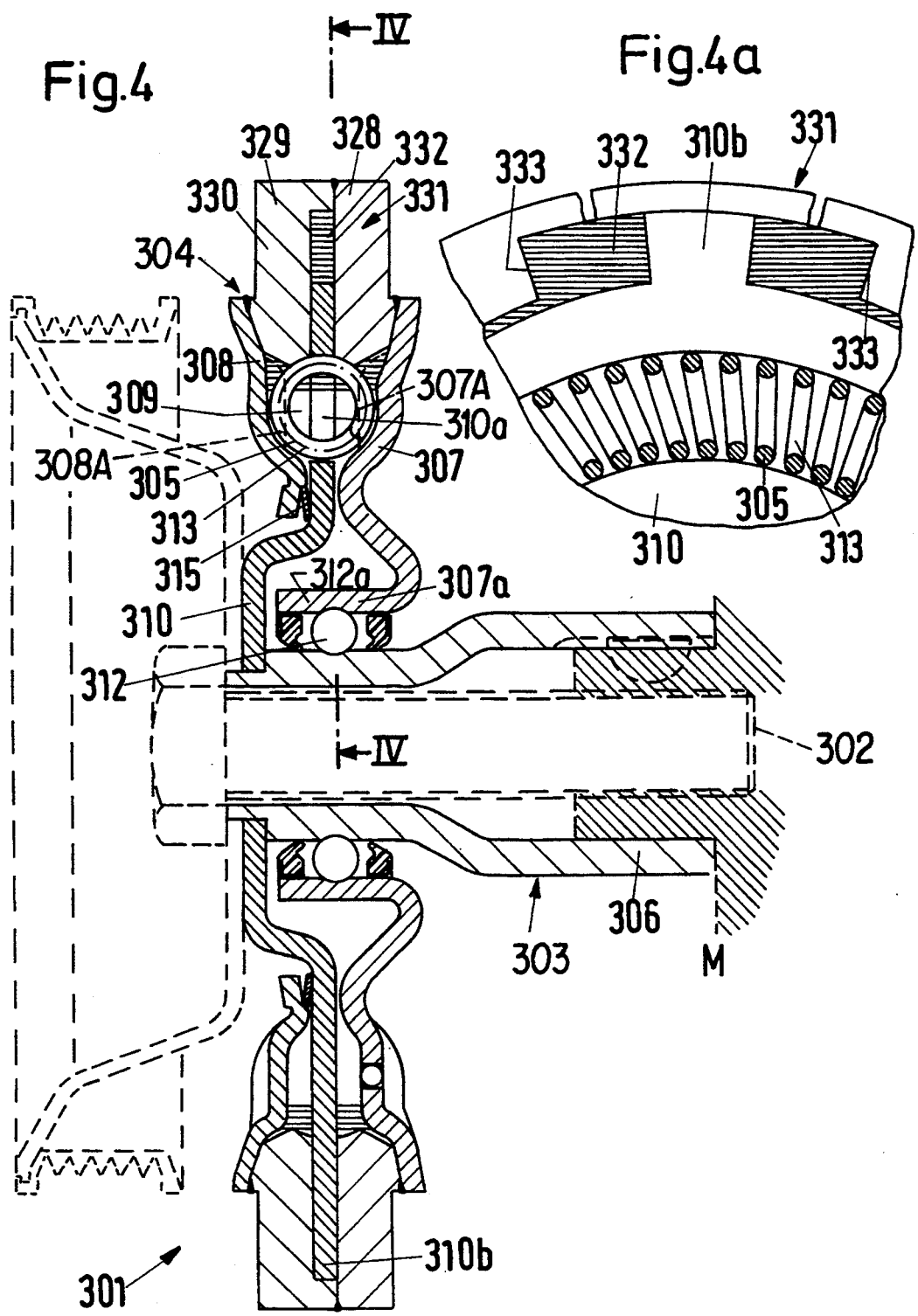

PULLEY WHEEL ELASTIC ASSEMBLY

BACKGROUND OF THE INVENTION

The invention relates to rotary disc- or wheel-shaped parts in general, and more particularly to improvements in rotary parts which can perform the function of, or can be used in conjunction with, driving or idler pulleys. For the sake of convenience and simplicity, the rotary parts to which the present invention pertains will be called sheaves.

German patent application No. 34 02 001 A1 of Bannasch et al. (published Jun. 30, 1985) discloses a pulley wherein a grooved rim is connected to a hub by a damper consisting of a relatively thick rubber disc. A drawback of such pulleys is that their useful life is rather short because the material of the disc is affected by heat and by the developing torque. Furthermore, the extent of angular displacement of the rim and hub relative to each other is rather small because the so-called spring rate or spring gradient is relatively small and, therefore, an operation within the critical range is unavoidable. In addition, pronounced internal friction of the material of the disc entails that the insulating effect within the supercritical range is relatively decoupling. This, in turn, renders it necessary to employ a relatively large V-belt as well to resort to complex and expensive belt tensioning devices. The belt must be tensioned with a considerable force, and the space requirements of the pulley (particularly in axial direction) are quite pronounced. The situation is analogous if the rubber disc is Bannasch et al. is built into a so-called inertial damper. Heretofore known inertial dampers are rotated by a shaft or by another driving member without the interposition of an antifriction bearing between their input and output elements.

OBJECTS OF THE INVENTION

An object of the invention is to provide a sheave which can be used as a pulley and/or as an inertial damper and whose useful life is longer than that of heretofore known sheaves.

Another object of the invention is to provide a sheave which can be utilized in motor vehicles as a means for transmitting torque to pumps, fans, air conditioning units and/or other auxiliary aggregates.

A further object of the invention is to provide a sheave whose operation is satisfactory within a wide range of rotational speeds.

An additional object of the invention is to provide a sheave which can be utilized to transmit torque from the output member (such as a crankshaft) of an internal combustion engine to one or more aggregates and is not only operative but functions in a highly satisfactory manner within the full range of rotational speeds of the output member.

Still another object of the invention is to provide a sheave which can be used to transmit torque during each stage of operation of an engine including idling and rotation of the output member at a maximum speed, A further object of the invention is to provide a sheave whose operation is satisfactory within the supercritical range of operation of an internal combustion engine, An additional object of the invention is to provide a sheave which is designed to counteract undesirable stray movements of one or more parts receiving torque therefrom during acceleration from zero speed as well as during deceleration back to zero speed.

Another object of the invention is to provide a sheave which can be used to transmit motion to different types of belts or chains, particularly to belts or chains which perform different vibratory movements when driven by the rim of a pulley or sprocket wheel.

Still another object of the invention is to provide a sheave which comprises a relatively small number of simple and inexpensive parts and whose constituents can be assembled by automatic machinery.

A further object of the invention is to provide a sheave which renders it possible to lower the idling RPM of an internal combustion engine and to thus reduce the fuel requirements of, as well as the generation of noise by, the engine.

Another object of the invention is to provide a sheave which can be installed in existing motor vehicles and in other types of machines as a superior substitute for heretofore known sheaves.

SUMMARY OF THE INVENTION

The invention is embodied in a sheave which comprises a rotary input element connectable to a rotary driving component, such as the output member (e.g., the crankshaft) of an engine (such as an internal combustion engine in a motor vehicle), an output element which is coaxial with and is rotatable relative to the input element, a housing which defines an at least partially sealed annular chamber for a supply of viscous fluid, a friction reducing device disposed between the two elements, and a damping unit between the two elements. The damping unit comprises at least two convoluted energy storing members which consist of steel and are disposed in the chamber, first deforming means rotatable with the input element, and second deforming means rotatable with the output element. The deforming means are disposed in the chamber to engage and stress the energy storing members in response to rotation of the two elements relative to each other.

The improved sheave can further comprise a rim which is engageable by a flexible member (such as one or more endless belts or chains) and is driven by the output element, or an annular inertial damper which is driven by one of the elements.

In accordance with a presently preferred embodiment of the invention, the energy storing members are coil springs.

The energy storing members can have a torsion ratio of 0.5 to 2.5 Nm per degree, preferably between 1.2 and 1.8 Nm per degree.

Each coil spring can extend in the annular chamber along an arc of 90°–175°, preferably along an arc of 130°–170°. Each coil spring comprises normally spaced apart neighboring convolutions, and the two elements can be mounted for rotation relative to each other until the neighboring convolutions of the coil springs abut each other, i.e., until each spring constitutes a block of abutting convolutions.

The coil springs can constitute preshaped arcuate elongated springs each of which has a radius of curvature at least approximating the radius of curvature of the annular chamber. At least one of the elongated coil springs can comprise a series of discrete shorter sections. For example, each shorter section can constitute a substantially straight coil spring, and the at least one arcuate elongated coil spring then further comprises suitably configured inserts between neighboring straight coil springs so that the straight coil springs and the inserts jointly form an arcuate elongated coil spring having a radius of curvature which approximates that of the annular chamber.

The housing includes a portion which is disposed radially outwardly of the energy storing members in the chamber. Such members exhibit a tendency to move in the chamber radially outwardly toward the aforementioned portion of the housing under the action of centrifugal force in response to rotation of the two elements. The sheave preferably further comprises at least one insert which is disposed in the chamber between the energy storing members and the aforementioned portion of the housing to be engaged by the energy storing members when such members are acted upon by centrifugal force. The at least one insert can comprise a substantially trough-shaped part which is interposed between the aforementioned portion of the housing and the energy storing members.

The housing can form part of at least one of the two elements.

The sheave can further comprise means for sealing the chamber to prevent escape of the supply of viscous fluid. The sealing means can comprise a sealing member which is rotatable with one of the two elements and is rotatable relative to the other of the two elements. The arrangement may be such that the sealing member is in frictional engagement with at least one of the two elements. The sealing means can be designed to oppose rotation of the input and output elements relative to each other.

An inertial damper can be provided on the input element.

The aforementioned rim can be of one piece with the housing.

A torque limiting coupling can be installed between the two elements.

The sheave can further comprise a hydraulic damper between the two elements. Such hydraulic damper can constitute a hydrostatic or a hydrodynamic damper and can be constructed and assembled to produce a shearing effect.

The output element is designed to drive one or more parts, e.g., one or more rotary parts in a motor vehicle. The moment of inertia ($I_1$) of the output element plus the part or parts which are driven by the output element is greater than the moment of inertia ($I_2$) of the input element. The ratio of $I_1$ to $I_2$ is at least ten.

The housing can form part of the input element.

Alternatively, the housing can form part of the output element and the latter can carry, or it can be of one piece with, a rim for at least one flexible member.

The housing can comprise a plurality of sections in the form of walls, and a rim which is engageable by one or more flexible members can be made of one piece with one wall or section of the housing. For example, the housing can comprise two sections one of which is of one piece with a rim. Such housing can further comprise a welded seam or other suitable means for securing the rim to the other section.

The sections of the housing can be made of metallic sheet material, and such sections can have portions which are disposed radially outwardly of the chamber. The housing embodying such sections can further comprise a bond (e.g., a welded seam) between the sections.

The input element can constitute a shaped (e.g., stamped and/or otherwise profiled) article of metallic sheet material.

The sheave can comprise a friction generating device between the two elements. The arrangement may be such that the two elements are rotatable relative to each other from a neutral position first through a first angle and thereupon through a second angle, and the friction generating device can comprise means for opposing rotation of the two elements relative to each other through the second angle.

As mentioned hereinabove, the rotary driving component can constitute an output member of an engine. The housing can include a first wall which is nearer to the engine and a second wall which is more distant from the engine, and the sheave can further comprise means for sealing the chamber including a sealing member which is installed between the second wall and the output element.

The friction reducing device can include at least one antifriction bearing having two races which define a space, rolling members in the space, and means for sealing the rolling members in the space and for simultaneously sealing a first portion of the chamber from the atmosphere. Such sheave can further comprise means for sealing a second portion of the chamber from the atmosphere. One of the races can be of one piece with one of the two elements. Furthermore, the other race can be of one piece with the other element.

The mass moment of inertia of the output element can be greater than the mass moment of inertia of the input element. For example, the ratio of these moments of inertia can be at least ten-to-one or more.

The novel features which are considered as characteristic of the invention are set forth in particular in the appended claims. The improved sheave itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 3 is an axial sectional view of a third sheave;

FIG. 3a is an enlarged fragmentary axial sectional view of a sheave which constitutes a first modification of the sheave of FIG. 3;

FIG. 3b is a similar enlarged fragmentary axial sectional view of a sheave which constitutes a second modification of the sheave of FIG. 3;

FIG. 4 is an axial sectional view of a sheave which constitutes an inertial damper and is installed on the output member of an engine adjacent a pulley for a V-belt; and FIG, 4a is a fragmentary sectional view substantially as seen in the direction of arrows from the line IVa—IVa in FIG. 4.

DESCRIPTION OF PREFERRED EMBODIMENTS

Figure 1:
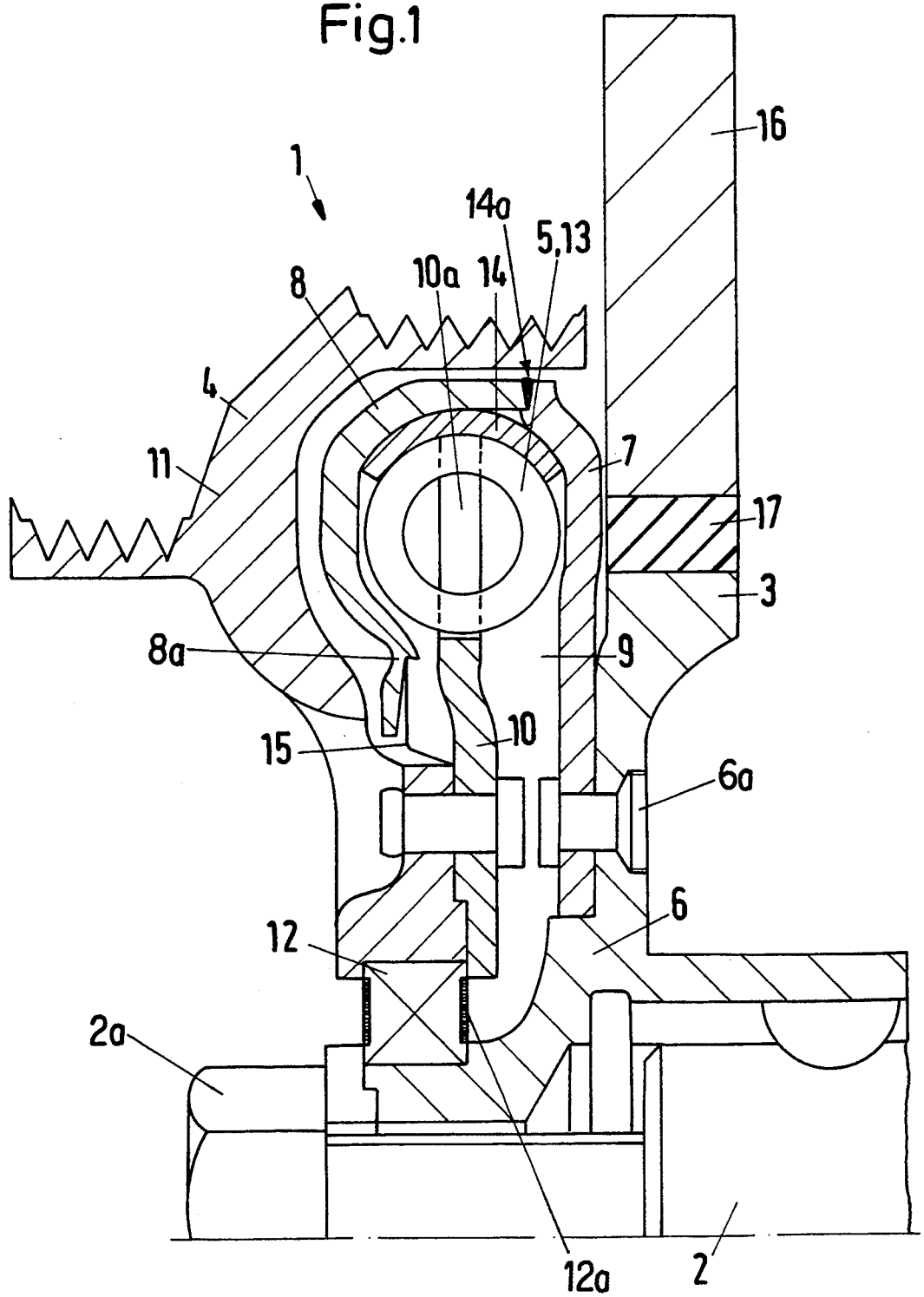
FIG. 1 is a fragmentary axial sectional view of a sheave which embodies one form of the invention and is designed to drive two endless flexible members, an inertial damper being provided on the input element of the sheave.

Referring first to FIG. 1, there is shown a sheave 1 which can be used as a pulley for transmission of motion from the rotary output member or driving component 2 of an engine to two V-belts trained over the corresponding portions of a stepped rim 11. The output member 2 can constitute the crankshaft of an internal combustion engine in a motor vehicle and is non-rotatably secured to the input element 3 of the sheave by a bolt 2a or another suitable fastener. The input element 3 transmits torque to an output element 4 which is of one piece with the rim 11. The sheave 1 further comprises a friction reducing device 12 (e.g., an antifriction ball or roller bearing) which is installed between a hub 6 of the input element 3 and the adjacent portion of the output element 4, and a damping unit 5 which is interposed between the elements 3, 4 and permits these elements to rotate relative to each other within a selected angle against the opposition or resistance of energy storing members 13 in the form of arcuate elongated coil springs which are made of steel and are preferably preshaped (bent prior to insertion into the sheave 1) so that their radii of curvature equal or approximate the radius of curvature of an annular chamber 9. The chamber 9 is defined by an annular housing or casing including two sections or walls 7, 8 which constitute parts of the input element 3, and by a portion of the output element 4. The walls 7 and 8 which form the major part of the housing for the springs 13 are or can be made of metallic sheet material and include circumferentially complete (ring-shaped) portions adjacent the radially outermost portion of the chamber 9. Such radially outermost portions are sealingly secured to each other by a bond here shown as a welded seam 14a. The chamber 9 contains a supply of viscous fluid, such as grease or oil, which may but need not completely fill the chamber. For example, the quantity of fluid can be selected in such a way that the radially outermost portions of the springs 13 dip into a ring-shaped body of fluid when the shaft 2 drives the elements 3, 4 so that the supply of fluid is acted upon by centrifugal force.

The output element 4 comprises a substantially radially extending flange 10 having radially outwardly extending arms or prongs 10a which constitute one component of means for deforming the springs 13 in response to rotation of the elements 3 and 4 relative to each other. The other component of such deforming means is provided on the input element 3 and can include pairs of pockets which extend into the chamber 9 and form part of the walls 7 and 8. The pockets alternate with the springs 13, the same as the arms 10a. Thus, when the input element 3 turns relative to the output element 4, the arms 10a of the flange 10 cooperate with the pockets of the walls 7, 8 of the housing to cause the springs 13 to store energy. The manner of forming pockets on the walls 7, 8 will be readily understood by referring to FIG. 2 and/or by perusing the disclosure of commonly owned U.S. Pat. No. 5,042,632 granted Aug. 27, 1991 to Johann Jäckel for "Vibration damping apparatus"; the disclosure of this patent is incorporated herein by reference.

The flange 10 constitutes the output member of the damping unit 5, and the input member of this damping unit is constituted by the pockets on the walls 7, 8 of the input element 3.

The antifriction bearing 12 not only serves to reduce friction between the elements 3, 4 but also centers the element 4 on the hub 6 of the element 3.

The pockets can be replaced by rivets or by other suitable projections which are provided on the walls 7, 8 and extend into the chamber 9, namely into the spaces between neighboring springs 13.

The reference character 11a denotes one of several rivets which are employed to secure the flange 10 to the rim 11, and the reference character 6a denotes one of several rivets which are used to secure the wall 7 of the housing for the springs 13 to the hub 6 of the input element 3. The major part of the wall 8 of the housing for the springs 13 is confined between the radially outer portion of the rim 11 and the flange 10.

FIG. 1 further shows an arcuate trough-shaped insert 14 between the radially outermost portions of the springs 13 and the adjacent radially outermost portions of the housing including the walls 7, 8 of the input element 3. The insert 14 can be assembled of two or more portions which are disposed end-to-end in the circumferential direction of the chamber 9, and its purpose is to prevent the radially outermost portions of the springs 13 from bearing directly against the radially outermost portions of the walls 7, 8. The hardness of the material of the insert 14 exceeds the hardness of the material of the walls 7 and 8. For example, the insert 14 can constitute a suitably shaped strip of steel or the like. When the shaft 2 drives the input element 3 and the latter drives the output element 4, the springs 13 are acted upon by centrifugal force and the radially outermost portions of their convolutions then bear upon the insert 14 (rather than upon the radially outermost portions of the walls 7 and 8). The illustrated insert 14 extends along an arc of approximately 120°, as seen in the circumferential direction of the convolutions of the springs 13. If desired, the illustrated insert 14 can be replaced with an insert which extends along an arc of up to 180° to surround approximately one-half of each convolution of each spring 13.

The damping unit 5 preferably comprises a relatively small number of springs 13. For example, the damping unit 5 can employ two springs each of which extends along an arc of 90°–175°, preferably along an arc of 130°–179°. The number of springs 13 and their length (in the circumferential direction of the chamber 9) can be selected in dependency on the vibratory characteristics of the sheave 1 and the intended use of the sheave. For example, the number of springs 13 can be increased to four and each such spring can extend along an arc of nearly 90°. By utilizing elongated arcuate springs 13, the combined twisting moment or torsion ratio of such springs is or can be maintained at a very low value, e.g., in the range of between 0.5 and 2.5 Nm per degree. If the improved sheave is used as a pulley to transmit motion to one or more belts, chains or analogous flexible members, a torsion ratio or twisting moment in the range of 1.2 to 1.8 Nm per degree has been found to be highly satisfactory for many applications of the pulley.

Each spring 13 can consist of a single piece of steel wire which is convoluted and is bent in advance so that its radius of curvature prior to insertion into the housing including the walls 7 and 8 already matches or at least approximates the radius of curvature of the chamber 9. Alternatively, each spring 13 (or at least one of these springs) can be assembled of several relatively short sections each of which can constitute a coil spring and is straight or exhibits a minimal amount of curvature.

Such relatively short and relatively straight or straight sections can be assembled with suitable inserts or intermediate portions to jointly form a spring 13 which is elongated and whose radius of curvature approximates that of the chamber 9.

The aforediscussed torsion ratio can be increased, depending on the frequency, if the sheave 1 is equipped with an inertial damper.

The utilization of relatively long arcuate springs 13 enables the damping unit 5 to permit large angular displacements of the input and output elements 3 and 4 relative to each other. Such design of the damping unit 5 renders it possible to achieve more satisfactory damping of vibrations which develop when the shaft 2 of the engine is to transmit motion to one or more flexible members which are trained over the rim 11. This is due to the fact that the damping rate between the elements 3 and 4 is low within the major part, or even within the entire range, of angular movements of these elements relative to each other.

The maximum extent of angular movability of the elements 3 and 4 relative to each other is determined by the springs 13. Thus, the angular movement is terminated when the neighboring convolutions of each of the coil springs 13 abut each other so that each of these springs then acts not unlike a solid body.

An advantage of coil springs 13 which are made or bent to assume an arcuate shape prior to insertion into the chamber 9 is that such design of the springs simplifies their insertion into the housing and renders it possible to complete the assembly of the sheave within a short period of time. Thus, it is not necessary to flex elongated straight springs immediately prior to or during insertion into the chamber 9; instead, these springs are bent during making or elsewhere in the spring making plant rather than necessitating forcible bending immediately prior to insertion between the walls 7, 8 of the input element 3. Otherwise stated, the springs 13 need not be stressed to assume an arcuate shape just prior to introduction into the chamber 9, but are unstressed and hence more readily insertable into the chamber.

If the springs 13 are assembled of relatively short straight or substantially straight sections with distancing and orienting inserts between them, the inserts can serve as a means for abutting the insert 14 when the thus formed springs are confined in the chamber 9 and are acted upon by centrifugal force as a result of rotation of the elements 3, 4 in response to rotation of the shaft 2.

The supply of friction reducing fluid (such as grease or oil) in the chamber 9 serves to reduce wear upon the walls 7, 8, insert 14 and springs 13. Furthermore, such fluid can be used to form part of a hydraulic damper between the input and output elements. This will be described with reference to FIGS. 4 and 4a. The hydraulic damper operates in parallel with the springs 13 and can be designed to constitute a hydrodynamic or a hydrostatic damper and/or a damper which produces a shearing effect. Reference may be had to commonly owned U.S. Pat, No. 5,048,658 granted Sep. 17, 1991 to Wolfgang Reik for "Torque transmitting apparatus".

The chamber 9 is sealed from the atmosphere by two discrete sealing elements 12a and 15. The sealing element 12a is one of two such sealing elements which are used to seal the space between the inner and outer races of the antifriction bearing of the friction reducing device 12. Such space receives one or more annuli of balls, rolls, needles or other suitable friction reducing rolling elements. The sealing element 15 is a resilient membrane which operates between the elements 3 and 4. More specifically, the radially innermost portion of the membrane 15 extends into a ring-shaped corner between the flange 10 and the rim 11, and the radially outermost portion of the membrane 15 is in frictional engagement with a ring-shaped shoulder 8a at the inner side of the wall 8. The membrane 15 slides relative to the shoulder 8a and/or relative to the flange 10 and rim 11 when the input element 3 rotates relative to the output element 4 and/or vice versa.

In order to prevent the development of pronounced peaks during transmission of torque from the shaft 2 to the rim 11, the sheave 1 can further comprise at least one friction generating device, a slip clutch, a friction clutch and/or a clutch which limits the magnitude of transmitted torque to a predetermined maximum value. Such clutch or clutches can be installed in series with the damping unit 5. For example, a friction generating device can be installed between the radially inner portion of the flange 10 and the adjacent portion of the rim 11 so that the parts 10 and 11 can turn relative to each other in response to an abrupt rise of torque which is being transmitted from the springs 13 to the arms 10a.

The sheave 1 further comprises an inertial damper having a washer-like mass 16 connected to the radially outermost portion of the hub 6 (i.e., to the input element 3) by a ring 17 of rubber or other suitable elastomeric material. The ring 17 is vulcanized or otherwise reliably secured to the radially innermost portion of the mass 16 and to the radially outermost portion of the hub 6.

An important advantage of the improved sheave 1 is its compactness. Thus, the damping unit 5 need not extend beyond the rim 11 in the radial and/or axial direction of the sheave.

The resilient membrane 15 acts as a sealing element to prevent the escape of the confined viscous fluid from the chamber 9 between the walls 7, 8 of the input element 3. In addition, this membrane can generate between the elements 3 and 4 frictional hysteresis in parallel with the springs 13. Additional friction damping action can be generated as a result of appropriate design of the friction reducing device 12. It is further within the purview of the invention to generate frictional hysteresis by employing additional friction generating means which operate in parallel or in series with the springs 13. The additional friction generating means can be operative within the entire range of angular movability of the input and output elements 3, 4 relative to each other, i.e., from a starting position of these elements to a position in which the convolutions of each spring 13 abut each other to prevent any further angular displacement of the elements 3 and 4 relative to each other. To this end, one can employ so-called load responsive friction generating devices which cooperate with at least one of the springs 13, or devices which are capable of establishing a delayed friction generating action. For example, the arrangement may be such that the elements 3 and 4 can turn relative to each other (from a starting position) through a first angle solely against the resistance of the springs 13, and thereupon through a second angle against the opposition of the springs 13 as well as against the action of one or more friction generating devices.

It has been found that the operation of the improved sheave 1 is quite satisfactory if the ratio of the mass moment of inertia $I_1$ of the output element 4 plus all of the parts which receive torque therefrom to the mass moment of inertia $I_2$ of the input element 3 plus the inertial damper 16, 17 is at least ten-to-one.

Figure 2:
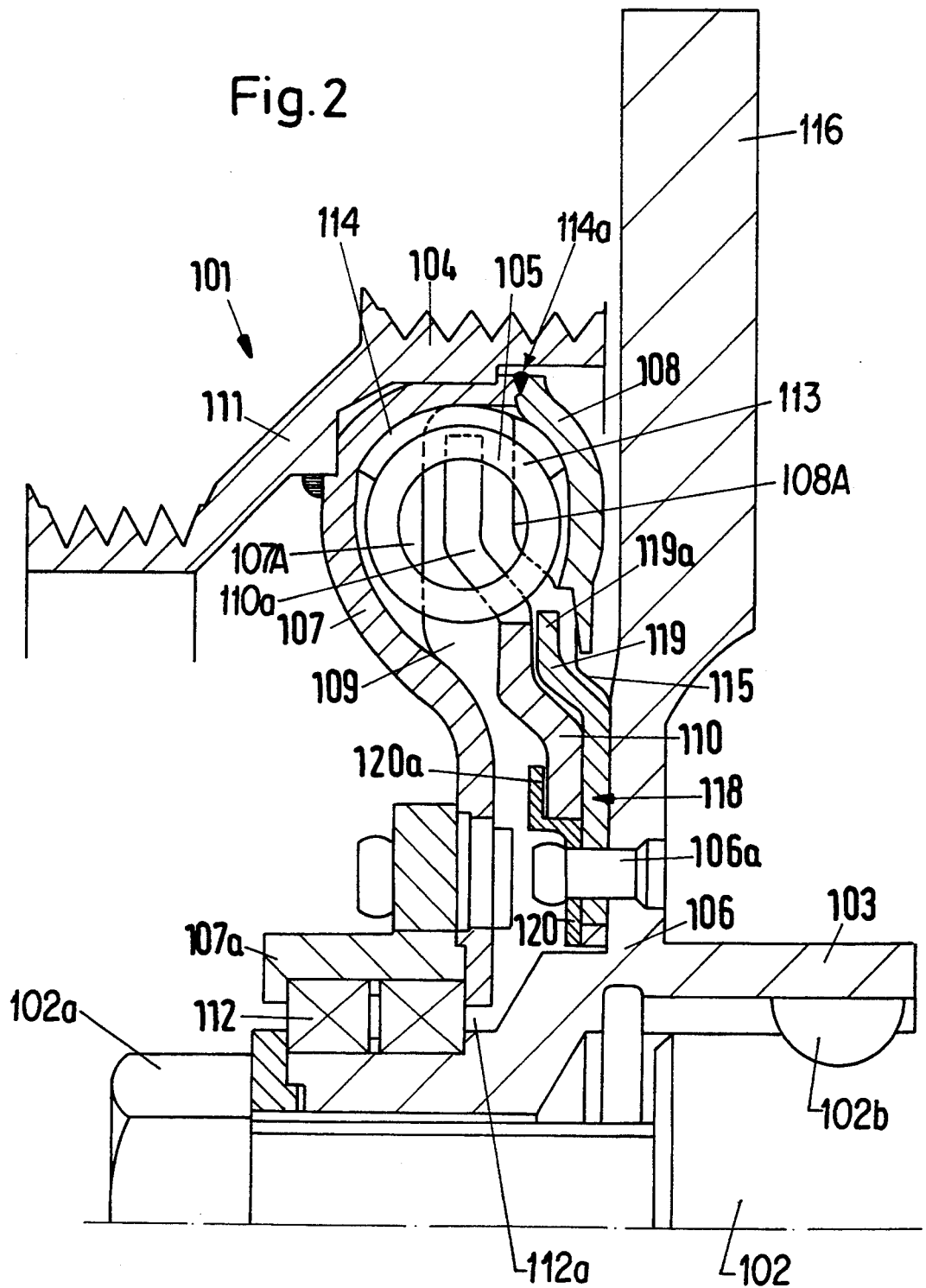
FIG. 2 is a similar fragmentary sectional view of a modified sheave wherein the housing for the energy storing elements of the damping unit forms part of the output element.

The sheave 101 of FIG. 2 differs from the sheave 1 in that the housing including the walls 107, 108 is mainly a component part of the output element 104. The flange 110 forms part of the input element 103 and is secured to the hub 106 of the input element by a set of rivets 106a. The damping unit 105 comprises energy storing members 113 in the form of elongated arcuate coil springs which are confined in the annular chamber 109. Each such spring is disposed between an arm 110a of the flange 110 and two pockets 107A, 108A which are provided on the walls 107, 108, respectively. The pockets 107A, 108A cooperate with the arms 110a to cause the springs 113 to store energy when the input and output elements 103, 104 are caused to leave their starting angular positions and to turn relative to each other; such angular movement can take place in a clockwise direction or in a counterclockwise direction. The chamber 109 is at least substantially sealed from the atmosphere and confines a supply of viscous fluid. The sealing means comprises a sealing element 112a for the internal space between the inner and outer races of the right-hand antifriction bearing 112 of FIG. 2, and a membrane-like sealing element 115 which is installed between the wall 108 and a washer-like portion 119 of the input element 103.

The portion 119 further forms part of a torque limiting coupling 118 between the hub 106 and the flange 110 of the input element 103. This coupling further comprises a washer-like portion 120 which is secured to the hub 106 by the rivets 106a. It is assumed that the washer-like portions 119, 120 of the coupling 118 are non-rotatably riveted to the hub 106. The radially inner portion of the flange 110 is clamped between the washer-like portions 119, 120. The hub 106 (with the portions 119, 120) is free to turn relative to the flange 110 when the torque to be transmitted from the input element 103 to the output element 104 reaches or exceeds a preselected value. The parts 119a, 120a of the washer-like portions 119, 120 of the coupling 118 can be provided with friction generating linings of any known composition to enhance friction between the portions 119, 120 on the one hand and the flange 110 on the other hand.

The radially inner portion of the membrane-like sealing element 115 for the chamber 109 is sealingly clamped between the portion 119 and the hub 106. The radially outer portion of the sealing element 115 is in frictional sealing engagement with the adjacent radially inner portion of the wall 108 of the housing which is formed primarily by the output element 104 and defines the chamber 109. It will be noted that the sealing element 115 bears against that wall (108) of the housing which is nearer to the engine including the output member 102; the engine is assumed to be located to the left of FIG. 2.

The output element 104 of the sheave 101 comprises a substantially cylindrical hub 107a which surrounds the outer races of the two antifriction bearings 112 constituting the friction reducing device of the sheave 101. The hub 107a is centered on the hub 106 of the input element 103 by the antifriction bearings 112. The rim 111 of the sheave 101 is welded to the wall 107 of the output element 104. A welded seam 114a establishes a seal and a bond between the radially outer portions of the walls 107, 108, i.e., at the locus of the insert 114 which separates the radially outermost portions of convolutions of the springs 113 from the adjacent radially outer portions of the housing which defines the annular chamber 109.

The hub 107a can constitute the outer race of the bearings 112. The driving member 102 is non-rotatably secured to the hub 106 of the input element 103 by one or more keys 102b. The bolt 102a is used to hold the driving member 102 and the hub 106 against axial movements relative to each other.

The inertial damper 116 of FIG. 2 can be said to constitute a flywheel which is integral with the radially outer portion of the hub 106. It is clear that this inertial damper can also comprise a rubber ring corresponding to the rubber ring 17 in the sheave 1 of FIG. 1.

FIG. 3 shows a sheave 201 wherein the rim 211 for an endless belt or chain (not shown) is of one piece with the radially outer portion of the wall 207. Another wall 208 of the housing for the annular chamber 209 is secured to the adjacent portion of the rim 211 by a welded seam 211a. The walls 207, 208 form part of the output element 204, and the flange 210 forms part of the input element 203 of the sheave 201. The flange 210 further constitutes the input element of the damping unit 205 which includes the energy storing members 213 in the chamber 209. Each energy storing member 213 is disposed between an arm 210a of the flange 210 and the respective pockets 207A, 208A of the walls 207, 208. The flange 210 is non-rotatably affixed to the hub 206 of the input element 203.

FIG. 3 shows a friction reducing device which comprises a single antifriction bearing 212 between the hub 206 and the radially innermost portion of the wall 207. This bearing has two discrete races defining a space for a set of spherical rolling elements. A sealing element 212a for the left-hand axial end of the space between the races of the bearing 212 constitutes a sealing element for the respective portion of the chamber 209. Another sealing element 215 for the chamber 209 is installed between the radially innermost portion of the wall 208 and the adjacent portion of the flange 210. The sealing element 215 is preferably resilient and can be non-rotatably connected to the flange 210 or to the wall 208 to frictionally but movably engage the part 208 or 210.

The sheave 201 can be modified by shaping the radially inner portion of the flange 210 in such a way that it constitutes the inner race of the antifriction bearing between the input element 203 and the output element 204. Furthermore, the radially innermost portion of the wall 207 can be designed to constitute the outer race of the bearing 212.

The sheave 201 further comprises a friction generating device 221 which operates between the wall 207 and the hub 206. This friction generating device comprises a first friction disc 222 having one or more openings for one or more projections 225 of the wall 208, a second friction disc 223 which is clamped between the inner race of the bearing 212 and an external shoulder of the hub 206, and a biasing member here shown as a diaphragm spring 224 which reacts against another external shoulder of the hub 206 and biases the radially inner portion of the friction disc 222 against the adjacent portion of the friction disc 223. The disc 223 rotates with the hub 206, and the disc 222 rotates with the wall 207. The discs 222, 223 can turn relative to each other against the opposition of the diaphragm spring 224 when the torque which is being transmitted by the hub 206 reaches a preselected value.

If the projection or projections 225 are snugly received in the respective opening or openings of the friction disc 222, the latter is compelled to share all angular movements of the wall 207, i.e., the friction generating device 221 is operative at all times, namely during each and every stage of angular movement of the wall 207 and disc 222. However, it is equally possible to design the friction generating device 221 in such a way that it is effective only during a certain stage of angular movement of the hub 206 and wall 207 relative to each other. Thus, all that is necessary is to select the size and/or shape of each projection 225 in such a way that it is received in the respective opening of the friction disc 222 with a certain amount of freedom of angular movement of the wall 207 and hub 206 relative to each other. The friction generating device 221 is then ineffective during an initial stage of angular movement of the hub 206 relative to the wall 207 (i.e., through a first angle of movement of the input and output elements 203, 204 relative to each other from a starting position) but is effective thereafter during the remaining stage of such angular movement.

The reference character M denotes a portion of an internal combustion engine which rotates the driving member 202 for the hub 206. The wall 207 is nearer to and the wall 208 is more distant from the engine M. The sealing element 215 operates at that wall (208) which is more distant from the engine M.

FIG. 3a shows a portion of a sheave which constitutes a modification of the sheave 201. The diaphragm spring 224 is installed in such a way that its radially outwardly extending prongs 226 extend through windows 210b of the flange 210. The surfaces bounding the windows 210b determine the extent of angular movability of the flange 210 and walls 207, 208 relative to each other, i.e., such surfaces perform the function of the surface or surfaces bounding the opening or openings which is or are provided in the friction disc 222 of FIG. 3 to receive the projection or projections 225.

FIG. 3b shows a portion of a sheave which constitutes another modification of the sheave 201 of FIG. 3. The friction generating device 221 of FIG. 3b is installed to operate between the flange 210 and the walls 207, 208 of the housing for the energy storing members of the damping unit (not shown in FIG. 3b). A friction generating ring 227 of the friction generating device 221 is rotatable relative to the wall 208 and is biased against the inner side of this wall by a resilient sealing element 215 for the annular chamber between the walls 207, 208. The sealing element 215 reacts against the flange 210. The ring 227 is further biased by the diaphragm spring 224 which reacts against the wall 207. This ring can be made of a suitable plastic material. The mode of operation of the friction generating device 221 of FIG. 3b is analogous to that of the devices 221 which are shown in FIGS. 3 and 3a.

FIGS. 4 and 4a show a sheave 301 which constitutes an inertial damper and is mounted on the rotary driving member 302 of an engine M. The driving member 302 further transmits torque to a pulley P which is indicated by phantom lines and which can be constructed in a manner as described in connection with FIG. 1, 2, 3, 3a or 3b. The input element 303 of the sheave or damper 301 includes a hub 306 which is driven by the member 302, and a flange 310 which is affixed to the front end of the hub. The output element 304 comprises two walls 307, 308 constituting the major part of a housing defining an annular chamber 309 for a damping unit 305. The energy storing members 313 of the damping unit 305 are installed between the arms 310a of the flange 310 and the pockets 307A, 308A of the walls 307, 308.

The friction reducing device of the sheave 301 comprises an antifriction ball bearing 312 having an inner race which is of one piece with the hub 306 of the input element 303 and an outer race which is of one piece with the radially innermost portion 307a of the wall 307 of the output element 304. The bearing 312 can be modified by shaping the radially inner portion of the flange 310 in such a way that it constitutes the inner race for one or more annuli of balls or otherwise configurated rolling elements in the space between the two races. The bearing 312 further comprises two annular sealing elements 312a one of which serves as a means for sealing the adjacent radially innermost portion of the chamber 309 from the atmosphere. Another portion of the chamber 309 is sealed from the atmosphere by a resilient membrane-like sealing element 315 which is installed between the radially inner portion of the wall 308 and the adjacent portion of the flange 310. The sealing element 315 is stressed in the axial direction of the sheave 301. This sealing element is in engagement with that wall (308) of the housing for the chamber 309 and damping unit 305 which is more distant from the engine M.

If desired or necessary, the illustrated antifriction bearing 312 can be provided with a separately produced outer race which is affixed to the radially innermost portion 307a of the wall 307 and/or with a separately produced inner race which is secured to the hub 306 or to the flange 310.

The radially outer portion of the chamber 309 between the walls 307, 308 of the output element 304 is sealed by two discrete washer-like sections 328, 329 of a mass 330 of the sheave or inertial damper 301. The sections 328, 329 are welded or otherwise sealingly secured to each other, the section 328 is welded or otherwise sealingly secured to the radially outer portion of the wall 307, and the section 329 is welded or otherwise sealingly secured to the radially outer portion of the wall 308. The construction of the sheave 301 can be simplified by making the section 328 of one piece with the section 329. Such one-piece mass is then welded to the walls 307 and 308.

An advantage of the twin-section mass 330 is that it forms, or it can form part, of a hydraulic damper 331. The damper 331 includes compartments 332 which are provided in the mass 330 and are filled with a viscous substance, such as grease. Each compartment 332 receives an extension or arm 310b of the flange 310. The extensions 310b serve to displace the viscous fluid in the respective compartments 332 and to thus cooperate with the energy storing members 313 of the damping unit 305. The characteristics of the damper 331 can be caused to conform to the characteristics of the members 313 of the damping unit 305, e.g., by appropriate dimensioning of the throttling paths for the flow of displaced viscous fluid in response to angular movement of the extension 310b and the mass 330 relative to each other.

The surfaces 333 bounding the compartments 332 in the mass 330 can serve as abutments for the extensions 310b of the flange 310 to thus determine the extent of angular movability of the input and output elements 303, 304 relative to each other. For example, the positions of the surfaces 333 can be selected in such a way that they are engaged by the respective extensions 310b prior to complete compression of the energy storing members 313, i.e., before the neighboring convolutions of such members are caused to actually abut each other. This renders it possible to avoid the application of excessive (peak) stresses to the energy storing members 313 and thus prolongs the useful life of the damping unit 305 and of the entire sheave 301.

The improved sheave can be modified in a number of additional ways, for example, by incorporating therein features of the sheave which is disclosed in the commonly owned copending patent application Ser. No. 07/925,595 filed simultaneously herewith by Peter Klein and Stefan Valtwies. The disclosure of the copending patent application is incorporated herein by reference. For example, the sheave of the present invention can employ one or more antifriction bearings exhibiting the features (such as dimensions, configuration and/or others) which are disclosed in the copending patent application of Klein et al. The same applies for the features of the rims and for cooling of the sheave. The features of the sheave which is disclosed in the copending patent application of Klein et al. can be embodied in lieu of or in combination with the features of the sheaves which are shown in FIGS. 1 to 4a. Furthermore, at least some features of the sheave which is disclosed in the present application are considered to be patentable per se.

An important advantage of the improved sheave is that the natural resonance of the system encompassing the sheave and the aggregate or aggregates which receive torque therefrom can be selected to be below the idling RPM of the internal combustion engine if such prime mover is utilized to rotate the driving member for the input element of the sheave. This renders it possible to operate the sheave within the supercritical range. It has been found that, if the improved sheave is used in a motor vehicle to transmit torque from the output member of the engine to one or more pumps, fans and/or other aggregates, the resonance RPM of the system encompassing the sheave and the part or parts receiving torque therefrom can be well below the idling RPM of the engine so that no resonance can develop during normal operation of the engine. The resonance RPM of the sheave can be selected to be between 100 and 300 revolutions so that such resonance RPM can be reached and surpassed already during starting of the engine; the starter ensures that the system including the sheave does not continue to resonate. The sheave of the present invention renders it possible to reduce the lack of uniformity of rotation by up to 90 percent which, in turn, reduces the stresses which act upon the endless flexible member or members. Consequently, it is possible to employ weaker and hence less expensive and more compact belts or chains, or the useful life of relatively strong belts or chains is prolonged accordingly. The same applies for the useful life of the part or parts which receive torque from such belts or chains. Still further, it is possible to reduce the tensioning of the belts or chains which entails additional savings for tensioning equipment and for the belts or chains because such flexible members are subjected to less pronounced wear. A reduction of tensional forces which must be applied to a belt or chain renders it possible to eliminate or to simplify the design of dampers which are often necessary for the belts or chains.

If the improved sheave is used as an inertial damper, e.g., in a manner as described with reference to FIGS. 4 and 4a, the spring rate or stiffness of the springs and the damping action can be caused to conform to the inertial frequencies which can be selected to be close to low engine RPM. This cannot be achieved, in an economical manner, by resorting to conventional elastic energy storing elements.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A sheave comprising a rotary input element connectable to a rotary driving component; an output element coaxial with and rotatable relative to said input element; a rim provided on one of said elements and including at least one profiled portion engageable by at least one flexible member; a housing defining an at least partially sealed annular chamber for a supply of viscous fluid; a friction reducing device disposed between said elements; and a damping unit between said elements, said unit comprising at least two convoluted energy storing members consisting of steel and being disposed in said chamber, first deforming means rotatable with said input element, and second deforming means rotatable with said output element, said deforming means being disposed in said chamber so as to engage and stress said members in response to rotation of said elements relative to each other.

2. The sheave of claim 1, further comprising an inertial damper driven by said output element.

3. The sheave of claim 1, wherein said rotary driving component is an output member of an engine and said energy storing members are coil springs.

4. The sheave of claim 1, wherein said members have a torsion ratio of 0.5 to 2.5 Nm per degree.

5. The sheave of claim 4, wherein said ratio is between 1.2 and 1.8 Nm per degree.

6. The sheave of claim 1, wherein said energy storing members are coil springs and each of said springs extends in said annular chamber along an arc of 90°–175°.

7. The sheave of claim 6, wherein said arc is 130°–170°.

8. The sheave of claim 1, wherein said energy storing members are coil springs each having normally spaced apart neighboring convolutions and said elements are rotatable relative to each other until the neighboring convolutions of said springs abut each other.

9. The sheave of claim 1, wherein said chamber has a predetermined radius of curvature and said energy storing members include elongated preshaped arcuate coil springs each having a radius of curvature which at least approximates said predetermined radius.

10. The sheave of claim 9, wherein at least one of said springs comprises a series of discrete shorter sections.

11. The sheave of claim 10, wherein said shorter sections are substantially straight and said at least one spring further comprises inserts between the sections of said series.

12. The sheave of claim 1, wherein said housing includes a portion disposed radially outwardly of said energy storing members and said members exhibit a tendency to move in said chamber radially outwardly toward said portion of said housing under the action of centrifugal force in response to rotation of said elements, and further comprising at least one insert disposed in said chamber between said energy storing members and said portion of said housing to be engaged by said energy storing members when said members are acted upon by centrifugal force.

13. The sheave of claim 12, wherein said at least one insert comprises a substantially trough-shaped part between said members and said portion of said housing.

14. The sheave of claim 1, wherein said housing forms part of at least one of said elements.

15. The sheave of claim 1, further comprising means for sealing said chamber, including a sealing member which is rotatable with one of said elements and is rotatable relative to the other of said elements.

16. The sheave of claim 1, further comprising means for sealing said chamber, including means for opposing rotation of said elements relative to each other.

17. The sheave of claim 1, further comprising an inertial damper provided on said input element.

18. The sheave of claim 1, further comprising a rim engageable by a flexible member and of one piece with said housing.

19. The sheave of claim 1, further comprising a torque limiting coupling between said elements.

20. The sheave of claim 1, further comprising a hydraulic damper between said elements.

21. The sheave of claim 20, wherein said hydraulic damper is a hydrostatic damper.

22. The sheave of claim 20, wherein said hydraulic damper is a hydrodynamic damper.

23. The sheave of claim 20, wherein said hydraulic damper is constructed and assembled to produce a shearing effect.

24. The sheave of claim 1, further comprising at least one part driven by said output element, said output element and said at least one part having a first mass moment of inertia $I_1$ and said input element having a second mass moment of inertia $I_2$, the quotient of said moments being at least ten.

25. The sheave of claim 1, wherein said housing forms part of said input element.

26. The sheave of claim 1, wherein said housing forms part of said output element and said a rim is provided on said output element.

27. The sheave of claim 1, wherein said housing comprises a plurality of walls and further comprising a rim engageable by a flexible member and of one piece with at least one of said walls.

28. The sheave of claim 1, wherein said housing comprises two sections and further comprising a rim engageable by a flexible member and being of one piece with one of said sections, and means for securing said rim to the other of said sections.

29. The sheave of claim 1, wherein said housing includes first and second sections consisting of metallic sheet material and having portions disposed radially outwardly of said chamber, and a bond between said portions of said sections.

30. The sheave of claim 1, wherein said input element constitutes a shaped article of metallic sheet material.

31. The sheave of claim 1, further comprising a friction generating device between said elements.

32. The sheave of claim 31, wherein said elements are rotatable relative to each other from a neutral position through a first angle and thereupon through a second angle, said friction generating device comprising means for opposing rotation of said elements relative to each other through said second angle.

33. The sheave of claim 1, wherein said rotary driving component is an output member of an engine and said housing includes a first wall nearer to and a second wall more distant from the engine, and further comprising means for sealing said chamber including a sealing member installed between said second wall and said output element.

34. The sheave of claim 1, wherein said friction reducing device comprises an antifriction bearing having two races and rolling members between said races, one of said races being of one piece with one of said elements.

35. The sheave of claim 34, wherein the other of said races is of one piece with the other of said elements.

36. The sheave of claim 1, wherein said input element has a first mass moment of inertia and said output element has a greater second mass moment of inertia.

37. The sheave of claim 36, wherein the ratio of said second moment of inertia to said first moment of inertia is at least ten-to-one.

38. A comprising a rotary input element connectable to a rotary driving component; an output element coaxial with and rotatable relative to said input element; a housing defining an at least partially sealed annular chamber for a supply of viscous fluid; a friction reducing device disposed between said elements and including an antifriction bearing having two races defining a space, rolling members in said space, and means for sealing said rolling members in ;said space and for simultaneously sealing a first portion of said chamber from the atmosphere; means for sealing a second portion of said chamber from the atmosphere; and a damping unit between said elements, said unit comprising at least two convoluted energy storing members consisting of steel and being disposed in said chamber, first deforming means rotatable with said input element, and second deforming means rotatable with said output element, said deforming means being disposed in said chamber so as to engage and stress said members in response to rotation of said elements relative to each other.

* * * * *